Feb. 25, 1936.  L. F. PREVETTE  2,032,307
FOLDING AEROPLANE WING
Filed Sept. 5, 1935  2 Sheets-Sheet 1
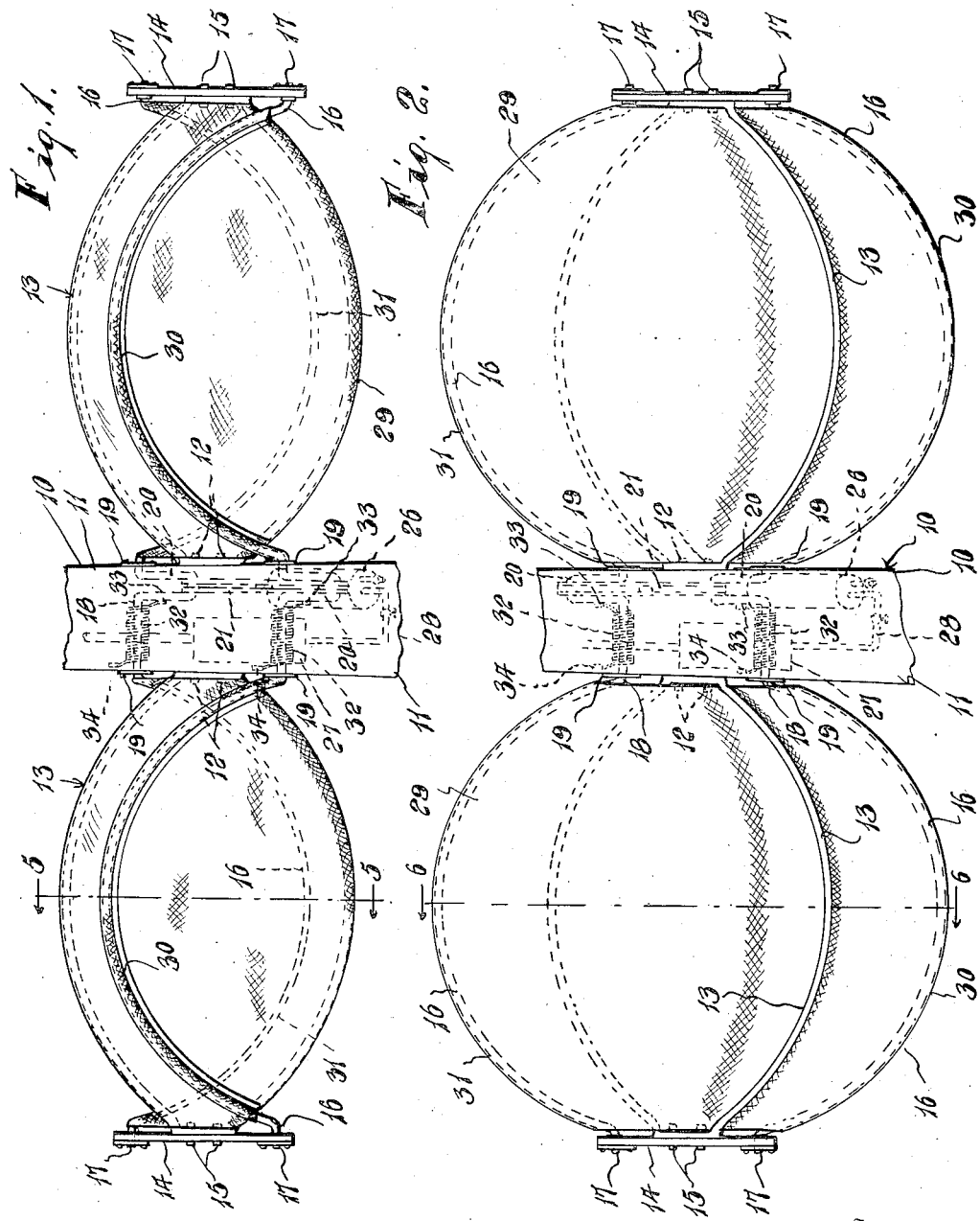
Inventor
Leander F. Prevette Feb. 25, 1936.  L. F. PREVETTE  2,032,307
FOLDING AEROPLANE WING
Filed Sept. 5, 1935    2 Sheets-Sheet 2
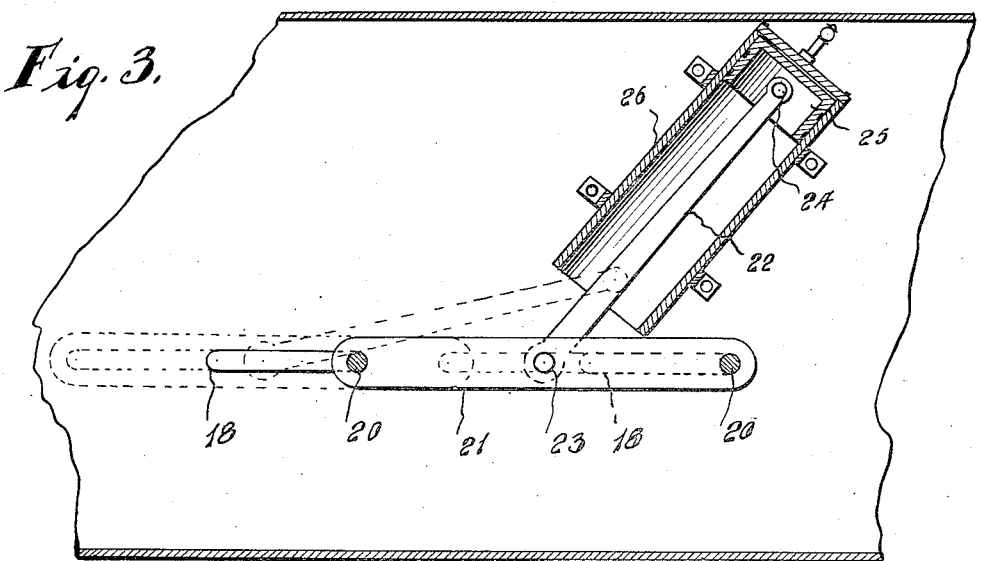
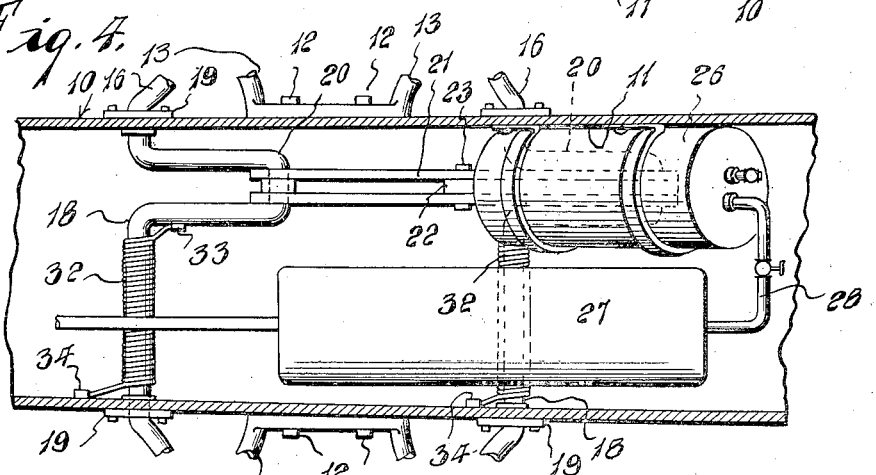
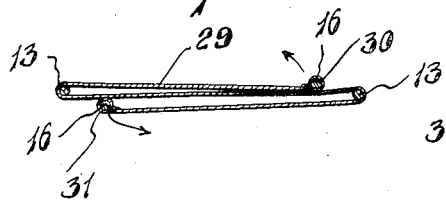
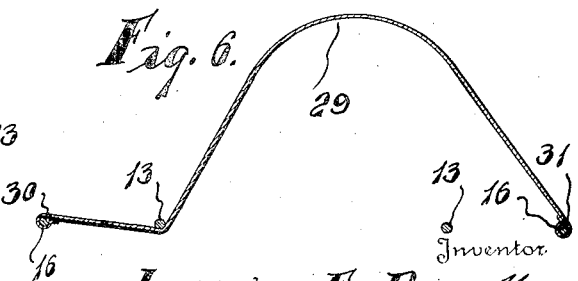
Inventor
Leander F. Prevette
By L. F. Randolph Jr.
Attorney Patented Feb. 25, 1936

2,032,307

UNITED STATES PATENT OFFICE 2,032,307

FOLDING AEROPLANE WING

Leander F. Prevette, Thomasville, N. C., assignor of one-half to B. T. Prevette, Lexington, N. C.

Application September 5, 1935, Serial No. 39,324

4 Claims. (Cl. 244—12)

This invention relates to wing construction for aeroplanes adapted to be normally taut so as to function as a wing during normal flight and which is foldable or adjustable for descending purposes, to provide slack and enable the wings to assume the shape of and function as parachutes.

Another object is to provide a novel means for operating the frames in order to fold and unfold the flexible material of the wings.

It is still further aimed to provide a novel construction wherein the unfolding is effected by air pressure means.

The more specific objects and advantages will become apparent from a consideration of the description following taken in connection with accompanying drawings illustrating an operative embodiment.

In said drawings:—

Figure 1 is a fragmentary plan view of an aeroplane equipped with my improvements, the wings being folded and in position for flight;

Figure 2 is a plan view of the parts of Figure 1, the wings being open and in parachute condition;

Figure 3 is a fragmentary longitudinal sectional view taken along the fuselage showing the mechanism for operating the wing frames;

Figure 4 is a horizontal sectional view showing the parts of Figure 3;

Figure 5 is a cross sectional view taken on the line 5—5 of Figure 1; and

Figure 6 is a cross sectional view taken on the line 6—6 of Figure 2.

Referring specifically to the drawings, the aeroplane as a whole is designated 10, having a conventional fuselage 11 having usual propulsion, steering and control means, the specific construction of which forms no part of the invention.

Suitably bolted or otherwise fixed as at 12 to opposite sides of the fuselage 11, are rigid frames 13, of closed generally oval form. Said frames 13 are disposed in a horizontal plane, and at their outer ends, brackets or bars 14 are bolted thereto as at 15. Movable arcuate frames 16 are terminally journaled in suitable bearings 17 on the bars 14 adjacent opposite ends thereof. Frames 16 of opposite sides of the fuselage are preferably connected together or formed of the same bar of metal, thus having portions 18 journaled in suitable bearings 19 on the fuselage, such portions also having cranks 20 connected by a bar or pitman 21, pivoted to the cranks. A connecting rod 22 is pivoted at 23 to the pitman, and such connecting rod 22 is pivotally connected at 24 to a piston 25 operable within a cylinder 26, suitably fastened within the fuselage, and having valved connections forming no part of the invention specifically, to control the passage of compressed air or the like from a supply tank 27 through a pipe 28 into the cylinder 26 to displace the piston 25.

Flexible coverings, for instance canvas sheets 29 are passed through the frames 13 and extend loosely across the same, being terminally connected as at 30 and 31 to the arcuate frame portion 16.

The frames 13 and 16 may be made from any suitable metal and for instance at the portions thereof adjacent the fuselage may be of steel while the outer portions thereof may be of aluminum. The frames 13 are adapted to swing or rotate in opposite directions and the connected portions thereof have coil springs 32 surrounding the same and at one end 33 being connected thereto while the opposite ends 34 are connected to the fuselage. Thus the springs normally urge one frame portion 13 against the upper surface of the fixed frame 13 and the companion frame portion 16 against the lower surface of the same frame 13.

Due to the action of said springs 32, as best shown in Figure 5, the sheets 29 of each wing are normally maintained taut for effective flying purposes. However, when it is desired to descend, sheets 29 are adapted to be slacked in order to assume parachute form. To this end, compressed air is admitted to the cylinder 26 which displaces the piston 25, causing the connecting rod 22 to shift the pitman 21, thus swinging the cranks 18, and causing the frames 13 to swing in opposite directions to the unfolded position shown in Figure 2. Of course after descent, the pressure within the cylinder 26 is relieved and the wings permitted to assume normal condition through the action of the springs 32.

Various changes may be resorted to provided they fall within the spirit and scope of the invention.

What is claimed is:—

1. An aeroplane wing or the like comprising a continuous frame, frames engaged therewith and movable in opposite directions, means operable to maintain the frames in folded condition, a covering passing through the first mentioned frame and secured adjacent its margin to each of the other frames, cranks on the movable frames, a pitman connecting said cranks, and spring means urging closing movement of the movable frames.

2. An aeroplane wing or the like comprising an endless frame adapted to be fastened at one end to a fuselage, a bar secured to the other end of said frame, arcuate frames adapted to be journaled on the fuselage and also journaled in said bar, cranks on the second mentioned frames, a pitman connecting said cranks, spring means urging movement of the second mentioned frames in opposite directions and against the first mentioned frame, operating means for said pitman, and a covering passing through the first mentioned frame and adjacent opposite ends being secured to the second mentioned frames, whereby the covering will be taut when the frames are folded and will be slack when they are unfolded to assume a parachute form.

3. An aeroplane wing or the like, comprising a rigid frame, other frames pivotally mounted on axes arranged substantially in the same plane as said rigid frame for folding movement thereon, in opposite directions, and a covering having opposite edges secured to said other frames and its intermediate portion passing through said rigid frame.

4. An aeroplane wing or the like, comprising a rigid oval-shaped frame, arcuate-shaped frames pivotally mounted on axes arranged substantially in the same plane as the rigid frame for folding movement thereon in opposite directions, a covering having opposite edges secured to said arcuate frames and its intermediate portion passing through said rigid frame, resilient means normally holding the arcuate frames folded in the rigid frame, and means to actuate the arcuate frames to unfolded positions.

LEANDER F. PREVETTE.